United States Patent
Beauducel et al.

(10) Patent No.: US 6,546,810 B1
(45) Date of Patent: Apr. 15, 2003

(54) PROCESS AND DEVICE FOR MEASURING THE VELOCITY OF FLOW OF A FLUID STREAM

(75) Inventors: Claude Beauducel, Henonville (FR); Thierry Lepage, Noisy le Roi (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/359,758

(22) Filed: Jul. 22, 1999

(30) Foreign Application Priority Data

Jul. 24, 1998 (FR) .............................. 98 09541

(51) Int. Cl.$^7$ ................................ G01F 1/66
(52) U.S. Cl. .................. 73/861.27; 73/861.28; 73/861.29
(58) Field of Search .............. 73/861.25, 861.26, 73/861.27, 861.28, 861.29, 861.31

(56) References Cited

U.S. PATENT DOCUMENTS

| | | | | |
|---|---|---|---|---|
| 4,065,665 A | * | 12/1977 | Rietsch | 324/76.82 |
| 4,308,754 A | | 1/1982 | Pedersen et al. | |
| 5,333,508 A | * | 8/1994 | Petroff et al. | 73/861.18 |
| 5,753,824 A | * | 5/1998 | Fletcher-Haynes | 702/48 |
| 6,062,091 A | * | 5/2000 | Baumoel | 73/861.27 |
| 6,067,861 A | * | 5/2000 | Shekarriz et al. | 367/89 |

FOREIGN PATENT DOCUMENTS

| | | |
|---|---|---|
| GB | 2 300 265 | 10/1996 |
| WO | 93/14382 | 7/1993 |

* cited by examiner

Primary Examiner—Hezron Williams
Assistant Examiner—Corey D. Mack
(74) Attorney, Agent, or Firm—Antonelli, Terry, Stout & Kraus, LLP

(57) ABSTRACT

A process and device for measuring the velocity of flow of a fluid stream by measuring the difference between the respective traveltimes of acoustic pulses emitted by means of a generator (G) respectively between two points ($P_A$, $P_B$) spaced out along the fluid stream, according to whether they are propagated upstream or downstream in relation to the direction of flow, a difference that is indicative of the displacement velocity of the fluid stream. Measurement of this traveltime difference comprises using an acquisition unit (A) coupled to a processing unit (P) allowing determination of the frequency spectrum of each pulse and measurement of the phase lag affecting at least part of the frequency spectrum of each pulse, resulting from the traveltime thereof. Measurement of the velocity of flow of the fluid stream and of the resulting flow rate is very accurate. The process can be applied in chemical industries, chromatography, etc.

27 Claims, 4 Drawing Sheets

PROCESS AND DEVICE FOR MEASURING THE VELOCITY OF FLOW OF A FLUID STREAM

BACKGROUND OF THE INVENTION

1. Field of the Invention

The present invention relates to a process and to a device for measuring the velocity and the flow rate of a fluid stream.

2. Description of the Prior Art

Accurate determination of the circulation rate of fluids in pipes and of the corresponding flow rates is important in many fields, notably in chemical plants, chromatography, etc.

A known process for determining the velocity and the flow rate of a fluid stream circulating in a pipe is for example described in WO-93/14,382 or U.S. Pat. No. 4,308,754. It essentially consists in measuring the difference between the respective traveltimes of acoustic pulses between emitting and receiving transducers situated along a fluid feeder, at a known distance from one another, according to whether the waves are propagated upstream or downstream in relation to the direction of flow.

The flowsheet of FIG. 1 shows two piezoelectric type emitting-receiving transducers for example, arranged on either side of a pipe in which a fluid circulates at a velocity v, in two transverse planes thereof at a distance from one another. They simultaneously emit, one in the direction of the other (slantwise), ultrasonic pulses of frequency $f_0$ (transducers tuning frequency) and of duration $t_0$ much shorter than the traveltime of the waves between the two transducers. The arrival times $t_{AB}$ and $t_{BA}$ of the signals are measured and the acoustic transit times (or traveltimes) $tv_1$ (in the direction of flow) and $tv_2$ (in the opposite direction) are deduced by subtracting therefrom the different parasitic lag times obtained by calibration.

Propagation times $tv_1$ and $tv_2$ are respectively written as follows:

$$tv_1 = \frac{L}{C + V \cos \alpha} \text{ and } tv_2 = \frac{L}{C - V \cos \alpha}$$

It is readily deduced therefrom that:

$$V = \frac{L \cdot \Delta t}{2 \cdot tv_1 \cdot tv_2 \cdot \cos \alpha}$$

where $\Delta t = tv_2 - tv_1$.

The flow rate is then expressed by $Qv = v \cdot S$, if S represents the cross-section of the stream.

In a practical example where the transducers are about 10 cm apart and the celerity of the waves in the fluid is 1500 m/s, the traveltime is about 60 $\mu$s. It can be noticed, with such a practical example, that if the desired accuracy is of the order of $10^{-3}$ when measuring the velocity of flow, it must be possible to measure time intervals of the order of a few ns. This is very difficult to achieve by direct measurement of the propagation times with detection of the times when the energy received exceeds a certain threshold, because the accuracy is generally insufficient and implies working out many averages.

The process according to the invention notably overcomes this drawback and obtains, at a comparatively much lower cost than with the previous solution, a very high accuracy when measuring the displacement velocity of a fluid stream and consequently the flow rate of this stream.

SUMMARY OF THE INVENTION

The process of the invention allows determination of the velocity of flow of a fluid stream by comparison of the respective traveltimes of acoustic pulses respectively emitted and received between points spaced out along the fluid stream, according to whether they are propagated upstream or downstream in relation to the direction of flow. It is characterized in that the average traveltime and the difference between the traveltimes are measured by determination of the frequency spectrum associated with each pulse received and precise measurement of the relative phase lags affecting the frequency spectra of the acoustic pulses received, resulting from their traveltime.

According to an advantageous embodiment (suitable for relatively less absorbent fluids), a first acoustic pulse is emitted at each point, a second acoustic pulse is emitted from another point and an echo, at this other point, of the first acoustic pulse are successively detected at each point, the frequency spectra of the various pulses detected are calculated, and the average traveltime of the acoustic pulses detected and the differences between their respective traveltimes are determined.

According to another embodiment, the average traveltime is determined from reference spectra obtained by calibration from spectra of received acoustic pulses.

According to another embodiment, the difference between the respective traveltimes of the acoustic pulses received is determined from their frequency spectra and from a time difference obtained by calibration.

According to a preferred embodiment, the process comprises transmitting acoustic pulses simultaneously from a first point along a fluid stream in the direction of a second point downstream from the first point and vice versa from the second point in the direction of the first point, and detecting the pulses received at both points in fixed reception windows subjected to the same time lag in relation to the common times of emission of these pulses, the phase lag measured for each frequency spectrum depending on the position of the corresponding pulse received in the corresponding reception window.

To remove any ambiguity about the phase lag value, the slope of the line representative of the phase variation as a function of the traveltime is preferably determined on a determined portion of the frequency spectrum of the pulses.

A device allowing implementation of the method comprises for example at least two emitting-receiving transducers arranged in distinct places along a fluid stream, an impulse generator connected to the transducers, a signal acquisition unit samples and digitizes the signals received by the transducers during a fixed acquisition window and a processing unit for determining the phase lags affecting at least a portion of the frequency spectrum of each pulse received, due to the variable traveltime of the acoustic pulses emitted.

The processing unit comprises for example a signal processor programmed to determine the FFT frequency spectrum of each signal from a series of samples acquired in said window.

The process according to the invention provides very high accuracy for measurement of the traveltime of waves through the fluid in motion. It allows very short time intervals difficult to measure with accuracy under acceptable economic conditions to be translated into large phase variations with great amplification. Simulations showed that accuracies higher than 1‰ can be obtained for velocity measurement.

BRIEF DESCRIPTION OF THE DRAWINGS

Other features and advantages of the process and of the device according to the invention will be clear from reading the description hereafter of a non limitative realization example, with reference to the accompanying drawings wherein.

DETAILED DESCRIPTION OF THE INVENTION

Figure 1:
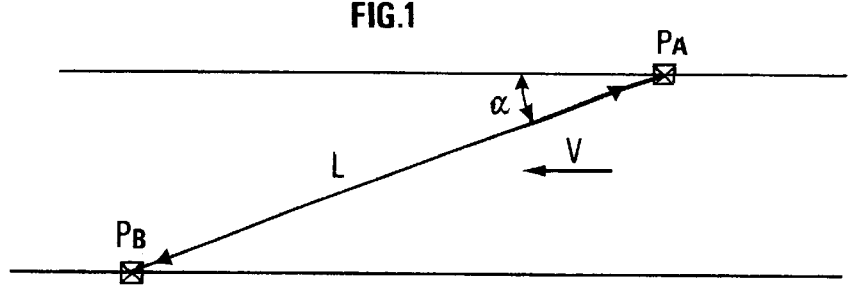
FIG. 1 is a diagram illustrating the measuring principle.
Figure 2:
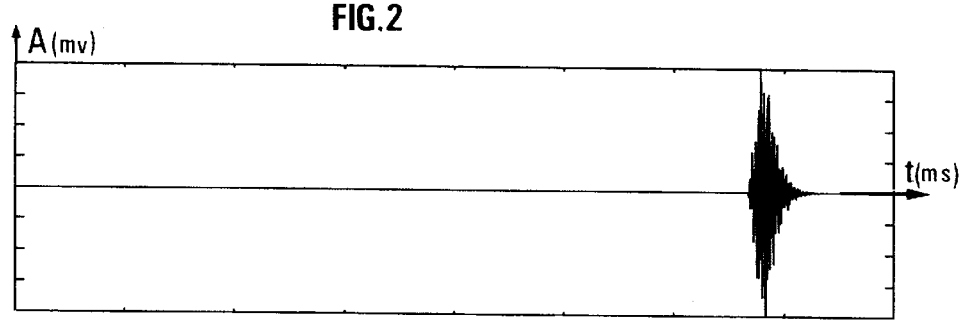
FIG. 2 shows an example of variation of the amplitude A of a received acoustic pulse as a function of time.

The process can be implemented for example by placing at two points A, B (FIG. 1) two ultrasonic wave emitting-receiving transducers $P_A$, $P_B$ respectively in two distinct cross-sections of a pipe in which a fluid stream circulates at a velocity V, so arranged that each one can receive the waves emitted from the other transducer. The tranducers simultaneously emit, one in the direction of the other (slantwise for example), ultrasonic pulses of frequency $f_0$ (transducers tuning frequency) and of duration $t_0$ much shorter than the acoustic transit time (or traveltime) tv of the waves between the two transducers. The arrival times $t_{AB}$ and $t_{BA}$ of the signal are measured (FIG. 2), and traveltimes $tv_1$ (in the direction of flow) and $tv_2$ (in the opposite direction) are deduced by subtracting therefrom the different parasitic lag times obtained by calibration.

The propagation times are respectively written as follows:

$$tv_1 = \frac{L}{C + V \cos \alpha} \text{ and } tv_2 = \frac{L}{C - V \cos \alpha}$$

It can be readily deduced therefrom that:

$$V \cong \frac{\Delta t \cdot L}{2 \cdot tv_1 \cdot tv_2 \cdot \cos \alpha}$$

where $\Delta t = tv_2 - tv_1$.

Measurement of $tv_1$ and $tv_2$ must be very accurate. In particular, the value of $\Delta t = (tv_1 - tv_2)$ must be known with a higher accuracy than that desired for the device. The measured times include the response times of the piezoelectric elements on emission and reception for translating the electric signals into waves and vice versa. These response times are not known a priori and they can be different from one device to the other because of manufacturing variations. On the other hand, they can be considered to be substantially constant in time. The method comprises accurate measurement of time intervals by measuring the phase lags existing between the signals, due to their propagation, whose principle, known in the art, is described hereafter.

Consider two signals $S_1$, $S_2$ emitted simultaneously from two transducers such as A, B during an emission window that is of course shorter than their traveltimes. They are respectively received at the opposite transducers in a single acquisition window opened at the same time $t_0$ and sampled with sampling frequency $F_e$, N samples (N is for example equal to 2048) of each of these three signals are acquired. Their complex frequency spectra $G_1(k)$, $G_2(k)$ are determined by FFT, k being a sampling index ranging from 0 to N−1 (N=number of points of the FFT).

If $G_1(f)$ and $G_2(f)$ are the Fourier transforms of the two signals, the corresponding discrete transforms are obtained by replacing f by the sequence of integers k with the correspondance:

$$f_k = \frac{kF_e}{N}$$

Fe being the sampling frequency.

$$\left(\frac{F_e}{N} = \text{frequency interval or } \Delta f\right).$$

These complex functions of k can be represented either by $G(k)=\rho(k)(\cos \theta(k)+j \sin \theta(k))$, or by $G(k)=\rho(k)e^{j\theta(k)}$ ($\rho$=amplitude, $\theta$=phase).

By application of the delay theorem, the Fourier transform of $S_2$ is: $G_2(f)=aG_1(f)e^{-2\pi i f(t2-t1)}$, (a representing the wave attenuation between the two receivers).

In the case of a discrete transform, if f is replaced by the sequence k such that:

$$f_k = \frac{kF_e}{N},$$

it is obtained:

$$G_2(k) = aG_1(k)e^{-2\pi i \frac{kF_e}{N}(t_2-t_1)} \quad (2)$$

If $G_2(k)$ and $G_1(k)$ are now represented by $\rho_2(k)e^{j\theta 2(k)}$ and $\rho_1(k)e^{j\theta 1(k)}$, equation (2) is written as follows:

$$\rho_2(k)e^{j\theta_2(k)} = a\rho_1(k)e^{j\left(\theta_1(k) - 2\pi j \frac{kF_e}{N}(t_2-t_1)\right)} \quad (3)$$

an equation that can also be written by means of the Napierian logarithm:

$$\ln(\rho_2(k)) + j\theta_2(k) = \ln(a\rho_1(k)) + j\left(\theta(k) - 2\pi \frac{kF_e}{N}(t_2 - t_1)\right)$$

which directly gives:

$$\Delta t = (t_2 - t_1) = -\frac{N}{2\pi k F_e}(\theta_2(k) - \theta_1(k)) \quad (4)$$

The function known as function of theoretical difference between the phases $\theta_\Delta(k)=\theta_2(k)-\theta_1(k)$ is a line passing through the origin for k=0 since $\Delta t=(t_2-t_1)$ is independent of k when remaining around a rather narrow portion (of ±150 kHz for example) of the spectrum centered around the emission frequency. The absolute value of the phase does not exceed π radians and the amplitude decreases rather fast on either side of the maximum with a correlative phase noise increase. The ambiguity about the value of the phase therefore has to be removed.

Method for Removing the Ambiguity About the Phase Difference

Figure 3:
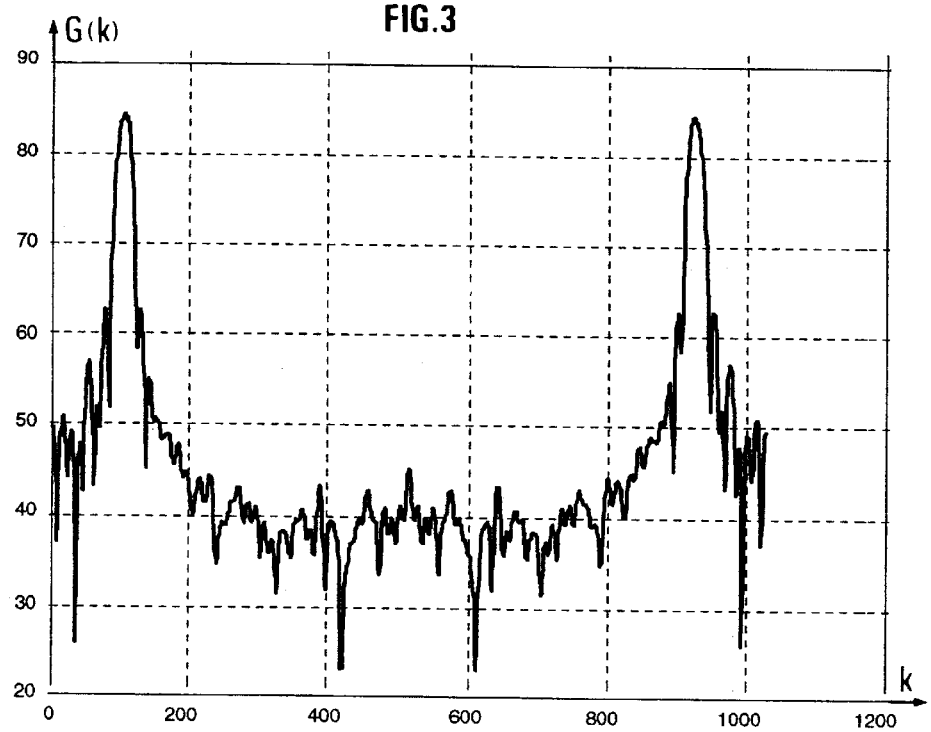
FIG. 3 shows an example of variation of the complex amplitude G(k) of the frequency spectrum of a received pulse as a function of the sampling index k, FIGS. 4a and 4b respectively show the variation of the amplitude G(k) of the frequency spectrum in the vicinity of a spectral maximum $I_M$ and the corresponding phase variation, FIGS. 5a and 5b respectively show the variation of the amplitude G(k) of the frequency spectrum in the vicinity of a spectral maximum $I_M$ and the relative phase difference obtained after restoration of the variation continuity.
Figure 4A:
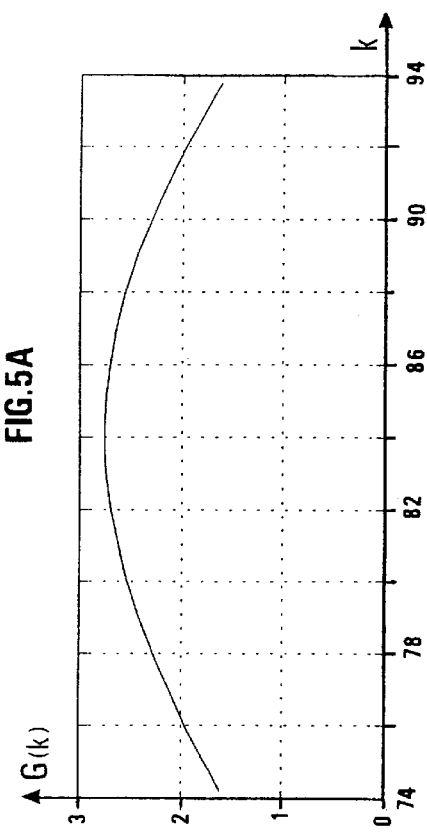
Figure 5A:
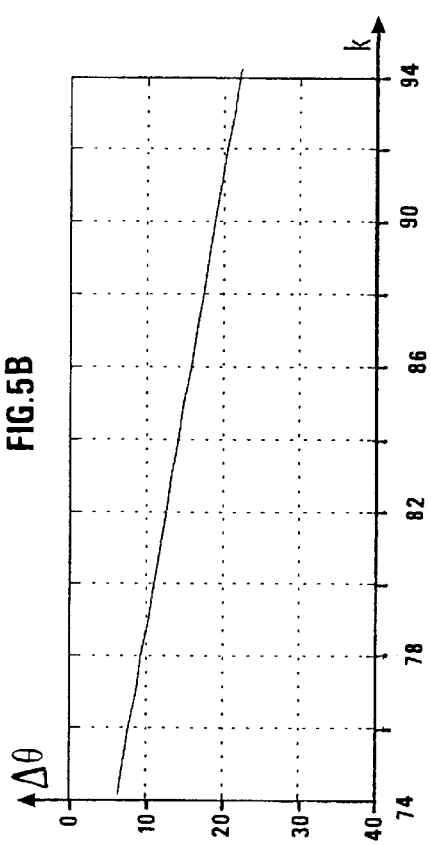
Figure 4B:
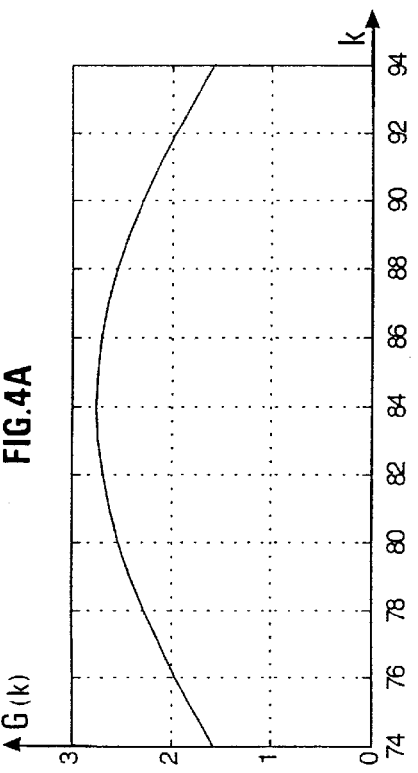
Figure 5B:
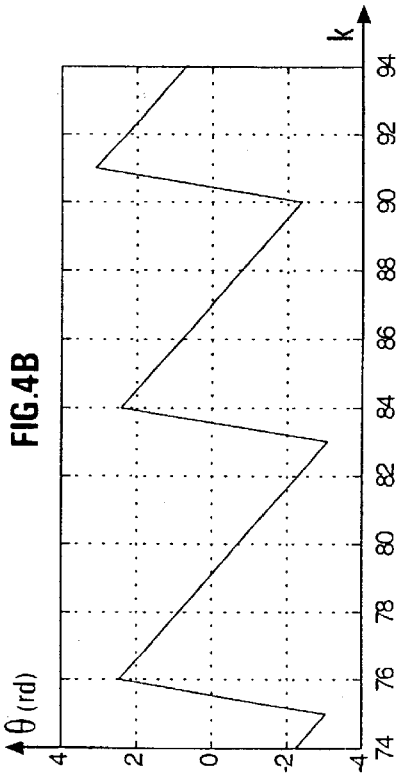

The maximum of the amplitude is determined on spectrum $G_1$ for example (FIG. 3), which gives an index k(Im) .±4 points are (for example) taken around Im on the 2 spectra $G_1$ and $G_2$, and the monotonicity of the phase variation is restored on these 9 points. This operation consists in replacing all the phase jumps of absolute value greater than π by their 2π complement (FIG. 5b). The phase values obtained for A and B are then subtracted point by point.

Figure 6:
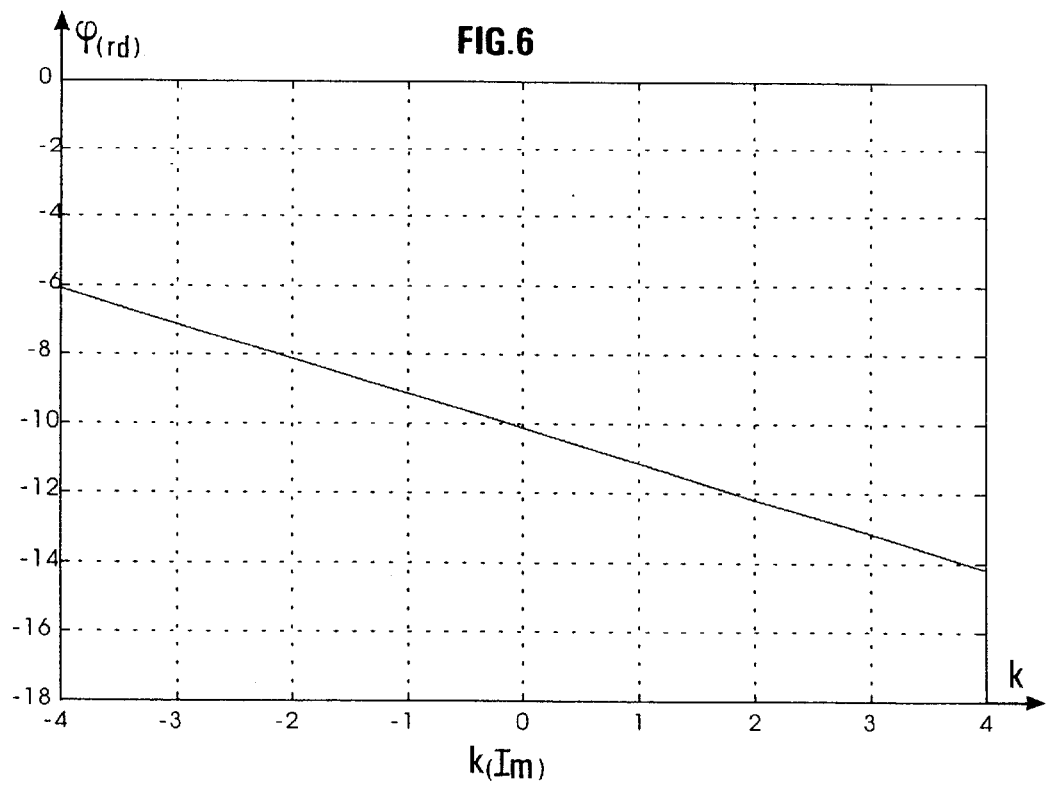
FIG. 6 shows the monotonic variation of the relative phase on 9 samples around the sampling index corresponding to a spectral maximum.

The relative phase difference is obtained (because it is known only to within 2nπ), i.e. $\theta r_\Delta(k)=\theta_1(k)-\theta_2(k)$, whose variation curve is only close to a straight line, unlike the theoretical phase difference curve (FIG. 6).

By definition, the estimated phase is a straight line: $\theta e_\Delta(k)=\sigma \times k$. Several methods can be used to determine the slope a of this line: calculation of a regression line going through the least squares at the points selected, calculation of the average of the slopes measured between two consecutive points, etc.

Figure 7:
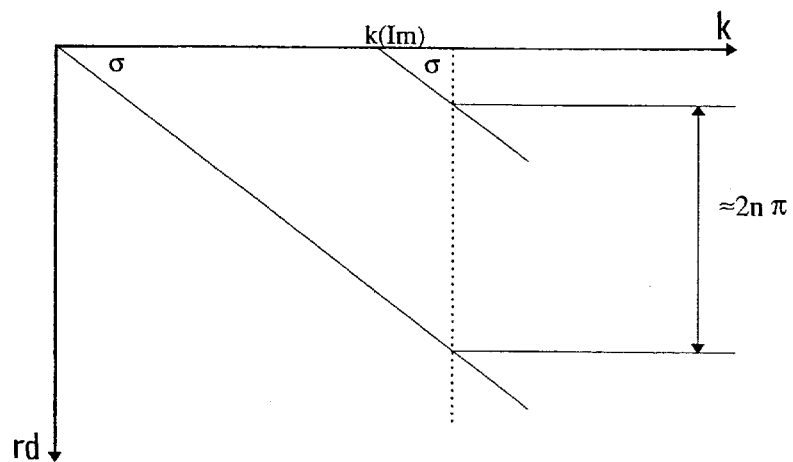
FIG. 7 illustrates the principle for calculating a calibration coefficient.

The difference between the estimated phase $\theta e_\Delta(k)$ and the relative phase difference $\theta r_\Delta(k)$ should thus be 2nπ (n integer representing a calibration coefficient) as illustrated by FIG. 7. To calculate τ, it is sufficient to have the phase at one point, for example the point corresponding to the maximum of the amplitude of the spectrum, i.e., Im.

The measuring results show that the accuracy of the relative phase difference, i.e. $\theta r_\Delta(Im)$, is higher than that of the estimated phase difference, i.e. $\theta e_\Delta(Im)=\sigma \times Im$. The absolute (or restored) phase difference is selected to be:

$$\theta_\Delta(Im)=\theta r_\Delta(Im)+2n\pi \quad (5)$$

with $$n = E^*\left(\frac{\theta e_\Delta(Im) - \theta r_\Delta(Im)}{2\pi} + 0.5\right) \quad (6)$$

($E^*$ representing the whole part).

It can be noted that, for this restoration to be achieved without errors, it is necessary and sufficient that:

$$|\theta e_\Delta(Im)-\theta r_\Delta(Im)-2n\pi|<\pi \quad (7)$$

The time τ is thus obtained with the formula:

$$\tau = \theta_\Delta(Im)\frac{N}{2\pi Im F_e}. \quad (8)$$

Echo Method

Figure 8:
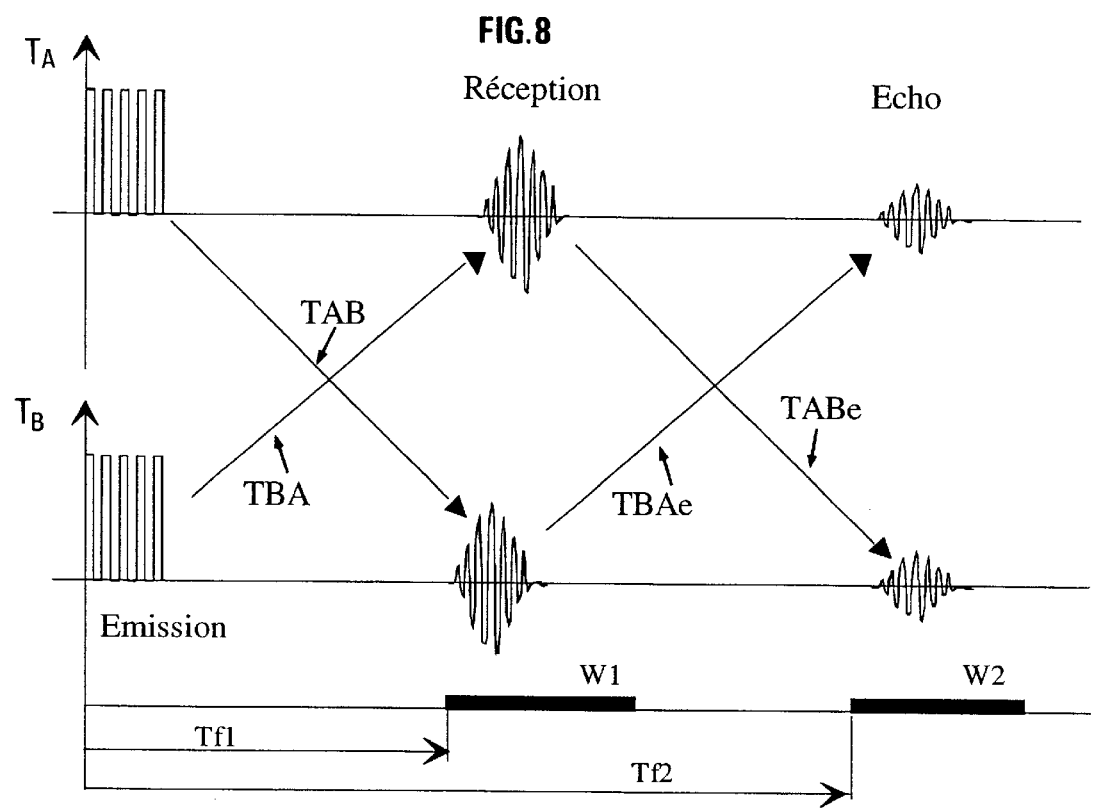
FIG. 8 illustrates the principle of the measuring method associating measurement of the direct arrivals of the pulses after propagation and measurement of the arrivals of their echoes in return.

This method uses the signal corresponding to the echo of the signal emitted by each transducer, that returns after reflection on the opposite target transducer (FIG. 8). It has been experimentally verified that, for less absorbent fluids such as water or liquefied gases such as LPG, the piezoelectric transducers switched to reception receive not only the signal from the opposite element, but also the echo of their own emission reflected on the surface of the opposite element.

The time intervals measured between the primary signals and the echo signals then no longer depend on the emission delays (common to the two signals), and the following procedure can be carried out.

Two measurement windows W1, W2 starting at times $Tf_1$ and $Tf_2$ are defined in relation to the time of emission of each wavetrain, so as to limit the number of points of the FFT and to have a good calibration coefficient n (meeting the criterion of equation (7)).

The times $T_{ABe}$ and $T_{BAe}$, which are the time lags between the signals of equal form from receivers A and B, are measured by recording the direct signals in window W1, i.e. $S_A$ and $S_B$, and the echo signals in window W2, i.e. $Se_A$ and $Se_B$ (for the same emission), and the four FFT complex spectra, i.e. $G_A(k)$, $G_B(k)$, $Ge_A(k)$ and $Ge_B(k)$, are calculated by FFT.

Determination of the Average Traveltime $t_{vm}$

The procedure defined above is applied twice:

between $Ge_A(k)$ and $G_B(k)$, which gives a time $\tau_{AB}=T_{ABe}$, i.e. difference (W1−W2)

between $Ge_B(k)$ and $G_A(k)$, which gives a time $\tau_{BA}=T_{BAe}$, i.e. difference (W2−W1) and finally $T_{ABe}=\tau_{BA}+(Tf_2-Tf_1)$ and $T_{BAe}=\tau_{AB}+(Tf_2-Tf_1)$.

If $r_{E-A}$ and $r_{E-B}$ respectively denote the delayed translation of the electric excitation signals of transducers A and B on emission into acoustic waves and if $r_{R-A}$ and $r_{R-B}$ denote the corresponding delays on reception by transducers A and B, the measured times $t_{AB}$ and $t_{BA}$ can be respectively expressed by:

$$T_{ABe}=tv_1+r_{R\_B}-r_{R\_A}$$

$$T_{BAe}=tv_2+r_{R\_A}-r_{R\_B}.$$

It can be seen that, by doing the half-sum, the parasitic delays cancel each other out and that the average traveltime $t_{vm}$ is expressed by:

$$\frac{T_{ABe}+T_{BAe}}{2} = \frac{tv_1+tv}{2} = t_{vm} \quad (8)$$

Determination of Δt

The values $\tau_{BA}$ and $\tau_{AB}$ allow determination of Δt to within a constant error:

$$T_{BAe}-T_{ABe}=tv_2+r_{R\_A}-r_{R\_B}-(tv_1+r_{R\_B}-r_{R\_A})=\Delta t+2r_{R\_A}.$$

Hence: $\Delta t=T_{BAe}-T_{ABe}-\tau_0=\tau_{AB}-\tau_{BA}-\tau_0$ $\tau_0$ can be obtained by calibration since it is known from equation (1) that Δt=0 if the velocity of the fluid is zero.

($\tau_0=\tau_{AB}-\tau_{BA}$ for V=0).

According to another embodiment, the time difference between signals $S_A$ and $S_B$ can also be measured directly by means of an aforementioned phase lag measurement between $G_B(k)$ and $G_A(k)$, which gives the time $\tau=t_{BA}-t_{AB}$:

$$t_{BA}-t_{AB}=tv_2-tv_1+r_{E\_B}+r_{R\_A}-r_{E\_A}-r_{R\_B}, \text{ i.e,}$$

$$\Delta t=\tau-(r_{E\_B}+r_{R\_A}-r_{E\_A}-r_{RB})=\tau-\tau_{p0}$$

the value $\tau_{p0}$ being obtained by calibration as above: $\tau_{p0}=\tau$ at V=0.

The previous two modes can also be combined and the average of the $\Delta t$ obtained is calculated in these two ways in order to increase the measuring accuracy.

Restored Reference Signal Method

It is possible that measurement of the velocity of very absorbent fluids (emulsions, muds, etc.) does not allow obtaining echoes. In this case, only the two spectra $G_A(k)$ and $G_B(k)$ corresponding to the signals $S_A$ and $S_B$ measured in window W1, obtained by FFT, are available when measuring.

$\Delta t$ can therefore be readily obtained as mentioned above.

In this case, determination of the average traveltime $t_{vm}$ requires two reference signals of the same form as the signals received but of zero acoustic delay, therefore reproducing the acoustic waves as emitted. In practice, this type of signal is not directly accessible. In the calibration phase, the average traveltime $t_{vm}$ can be determined by means of the aforementioned echo method by filling the measuring system with a suitable fluid. It is also possible to use a test loop having another velocity measurement mode with the required accuracy. These examples are of course not limitative. The spectrum $G_A(k)$ is multiplied by:

$$e^{2\pi j \frac{kFe}{N}(t_{vm}-Tf_1)}$$

The same procedure is applied to spectrum $G_B(k)$, and spectra $G_{0A}(k)$ and $G_{0B}(k)$ or reference spectra are thus obtained.

For measurement itself, the procedure of §4.1 is applied between $G_A(k)$ and $G_{0A}(k)$ on the one hand and between $G_B(k)$ and $G_{0B}(k)$ on the other, which leads to the values of $\tau_A$ and $\tau_B$. $tm=\frac{1}{2}(\tau_A+\tau_B)+Tf_1$ is deduced therefrom.

Since interest is only in the phases of the spectra on a small number of points around the maximum of the amplitude, the reference spectra can be limited to the phase values on these points.

Velocity Calculation

Traveltimes $tv_1$ and $tv_2$ are obtained by calculating $tv_1=tvm+\frac{1}{2}\Delta t$ and $tv_2=tvm-\frac{1}{2}\Delta t$, and relation (1) can be applied:

$$V = \frac{L \cdot \Delta t}{2 \cdot tv_1 \cdot tv_2 \cdot \cos \alpha}$$

or more simply with a negligible error:

$$V = \frac{L \cdot \Delta t}{2 \cdot tv_m^2 \cdot \cos \alpha}$$

The celerity C of the waves can be obtained by calculating:

$$C = \frac{L}{tvm}$$

Figure 9:
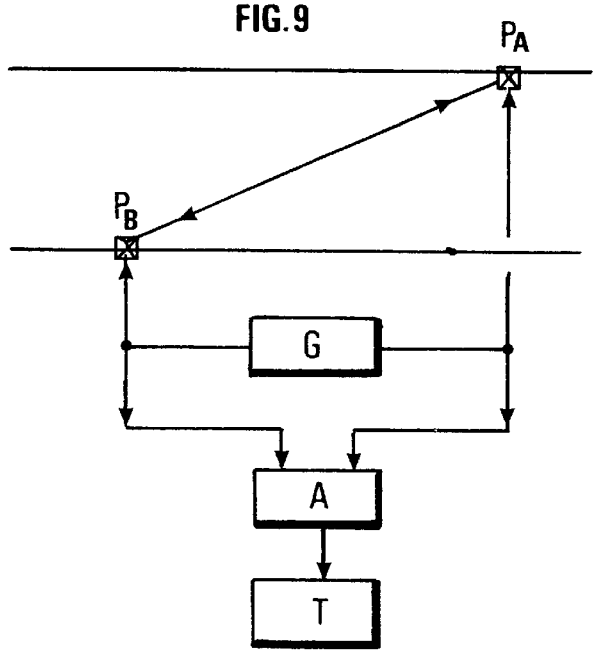
FIG. 9 shows a mode of layout of the device for implementing the process, with two acoustic pulse emitting-receiving transducers spaced out along a fluid stream.

The implementation device comprises (FIG. 9) an impulse generator G supplying transducers $P_A$ and $P_B$, and an acquisition unit A intended for acquisition of the signals picked up by these transducers after their propagation in the fluid stream, that is coupled to a processing unit T programmed for real-time computation of the time intervals and phase lags according to the method described. Switching means (not shown) allows successive connection of each transducer to signal generator G for pulse emission and to acquisition unit A as soon as emission is finished.

Processing unit T preferably comprises a specialized signal processor such as a DSP of a well-known type.

The process proposed keeps its performance if the nature of the fluid and therefore the emission frequency are changed: sampling frequency Fe will be adapted accordingly.

An embodiment of the process has been described where significant phase changes in the velocity of flow of a fluid stream are measured on pulses simultaneously emitted from two points, one situated downstream from the other in relation to the direction of flow, in the direction of the other point. Without departing from the scope of the invention, any other wave emission-reception device can be adopted, with transducers arranged differently in relation to the fluid stream, possibly distinct for emission and reception, allowing comparison or accumulation of traveltimes of pulses propagating in the direction of flow and countercurrent, whether emitted simultaneously or successively.

What is claimed is:

1. In a process for determining velocity of flow of a fluid stream by comparison of respective traveltimes of acoustic pulses emitted and received respectively between spaced apart points along the fluid stream, according to whether the acoustic pulses are propagating upstream or downstream in relation to a direction of flow of the fluid stream, a process comprising:

measuring an average traveltime and a difference between the traveltimes by determining a frequency spectrum associated with each received pulse; and measuring a relative phase lag affecting the frequency spectra of the received acoustic pulses resulting from the traveltime thereof.

2. A process as claimed in claim 1, wherein a first acoustic pulse is emitted at each point and an echo of the first acoustic pulse are subsequently detected at each point, the frequency spectra of the detected echo pulses are calculated and the average traveltime of the detected echo pulses is determined, as well as the differences between the respective traveltimes thereof.

3. A process as claimed in claim 2, wherein the average traveltime is determined from reference spectra obtained by calibration from spectra of received acoustic pulses.

4. A process as claimed in claim 3, comprising transmission of an acoustic pulse simultaneously from a first point of the spaced apart points along the fluid stream in the direction of a second point of the spaced apart points downstream from the first point and from the second point along the fluid stream in the direction of the first point, and detection of the pulses received at the first and second points in fixed reception windows subjected to an identical time lag in relation to common times of emission of acoustic pulses, and the phase lag being measured for each frequency spectrum depending on a position of a corresponding pulse received in corresponding reception window.

5. A process as claimed in claim 4, comprising in measuring relative phase lag determining each $2\pi$ modulo phase lag to remove any uncertainty about the velocity of the fluid stream.

6. A process as claimed in claim 5, comprising determining a slope of a straight line representative of the phase lag as a function of traveltime of a determined portion of the frequency spectrum of the received pulses.

7. A process as claimed in claim 3, comprising in measuring relative phase lag determining each $2\pi$ modulo phase lag to remove any uncertainty about the velocity of the fluid stream.

8. A process as claimed in claim 7, comprising determining a slope of a straight line representative of the phase lag as a function of traveltime of a determined portion of the frequency spectrum of the received pulses.

9. A process as claimed in claim 2, comprising transmission of an acoustic pulse simultaneously from a first point of the spaced apart points along the fluid stream in the direction of a second point of the spaced apart points downstream from the first point and from the second point along the fluid stream in the direction of the first point, and detection of the pulses received at the first and second points in fixed reception windows subjected to an identical time lag in relation to common times of emission of acoustic pulses, and the phase lag being measured for each frequency spectrum depending on a position of a corresponding pulse received in corresponding reception window.

10. A process as claimed in claim 9, comprising in measuring relative phase lag determining each $2\pi$ modulo phase lag to remove any uncertainty about the velocity of the fluid stream.

11. A process as claimed in claim 10, comprising determining a slope of a straight line representative of the phase lag as a function of traveltime of a determined portion of the frequency spectrum of the received pulses.

12. A process as claimed in claim 2, comprising in measuring relative phase lag determining each $2\pi$ modulo phase lag to remove any uncertainty about the velocity of the fluid stream.

13. A process as claimed in claim 12, comprising determining a slope of a straight line representative of the phase lag as a function of traveltime of a determined portion of the frequency spectrum of the received pulses.

14. a process as claimed in claim 1, wherein the difference between the respective traveltimes of the received acoustic pulses is determined from the frequency spectra thereof and from a time difference obtained by calibration.

15. A process as claimed in claim 14, comprising transmission of an acoustic pulse simultaneously from a first point of the spaced apart points along the fluid stream in the direction of a second point of the spaced apart points downstream from the first point and from the second point along the fluid stream in the direction of the first point, and detection of the pulses received at the first and second points in fixed reception windows subjected to an identical time lag in relation to common times of emission of acoustic pulses, and the phase lag being measured for each frequency spectrum depending on a position of a corresponding pulse received in corresponding reception window.

16. A process as claimed in claim 15, comprising in measuring relative phase lag determining each $2\pi$ modulo phase lag to remove any uncertainty about the velocity of the fluid stream.

17. A process as claimed in claim 16, comprising determining a slope of a straight line representative of the phase lag as a function of traveltime of a determined portion of the frequency spectrum of the received pulses.

18. A process as claimed in claim 14, comprising in measuring relative phase lag determining each $2\pi$ modulo phase lag to remove any uncertainty about the velocity of the fluid stream.

19. A process as claimed in claim 18, comprising determining a slope of a straight line representative of the phase lag as a function of traveltime of a determined portion of the frequency spectrum of the received pulses.

20. A process as claimed in claim 1, comprising transmission of an acoustic pulse simultaneously from a first point of the spaced apart points along the fluid stream in the direction of a second point of the spaced apart points downstream from the first point and from the second point along the fluid stream in the direction of the first point, and detection of the pulses received at the first and second points in fixed reception windows subjected to an identical time lag in relation to common times of emission of acoustic pulses, and the phase lag being measured for each frequency spectrum depending on a position of a corresponding pulse received in a corresponding reception window.

21. A process as claimed in claim 20, comprising in measuring relative phase lag determining each $2\pi$ modulo phase lag to remove any uncertainty about the velocity of the fluid stream.

22. A process as claimed in claim 21, comprising determining a slope of a straight line representative of the phase lag as a function of traveltime of a determined portion of the frequency spectrum of the received pulses.

23. A process as claimed in claim 1, comprising in measuring relative phase lag determining each $2\pi$ modulo phase lag to remove any uncertainty about the velocity of the fluid stream.

24. A process as claimed in claim 23, comprising determining a slope of a straight line representative of the phase lag as a function of traveltime of a determined portion of the frequency spectrum of the received pulses.

25. A device for determining velocity of flow of a fluid stream comprising:
   at least two emitting-receiving transducers spaced apart along the fluid stream;
   an impulse generator connected to the transducer which causes the transducer to emit acoustic pulses;
   a signal acquisition unit which samples pulse signals received by the transducers during a fixed acquisition window; and
   a processing unit which calculates by FFT a frequency spectrum of each sampled acoustic pulse signal and determines from the frequency spectrum a relative phase lag affecting a frequency spectrum of each sampled acoustic pulse signal due to a variable traveltime of the acoustic pulses.

26. A device as claimed in claim 25, wherein the processing unit comprises a signal processor programmed to determine a FFT frequency spectrum of each sampled acoustic pulse signal from a series of samples acquired in said window.

27. In a process for determining velocity of flow of a fluid stream by comparison of respective traveltimes of acoustic pulses emitted and received respectively between spaced apart points along the fluid stream, according to whether the acoustic pulses are propagated upstream or downstream in relation to a direction of flow, comprising:
   measuring an average traveltime and a difference between the traveltimes by forming a frequency spectrum using a FFT associated with each received pulse; and
   measuring relative phase lag of a maximum of each frequency spectrum.

* * * * *